United States Patent
Yamauchi et al.

(10) Patent No.: US 7,972,009 B2
(45) Date of Patent: Jul. 5, 2011

(54) PROJECTOR AND PROJECTION UNIT

(75) Inventors: Taisuke Yamauchi, Suwa (JP); Takashi Takeda, Suwa (JP); Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 12/170,119

(22) Filed: Jul. 9, 2008

(65) Prior Publication Data
US 2009/0040467 A1 Feb. 12, 2009

(30) Foreign Application Priority Data
Aug. 7, 2007 (JP) ................................. 2007-205429

(51) Int. Cl.
*G03B 21/14* (2006.01)

(52) U.S. Cl. .............. 353/38; 353/122; 349/5; 359/569; 359/599

(58) Field of Classification Search ................... 353/30, 353/31, 38, 97, 112; 349/5, 7; 359/15, 569, 359/599
See application file for complete search history.

(56) References Cited

U.S. PATENT DOCUMENTS

| | | | |
|---|---|---|---|
| 6,583,932 B1 * | 6/2003 | George et al. | 359/566 |
| 6,747,781 B2 | 6/2004 | Trisnadi | |
| 7,583,875 B2 | 9/2009 | Yamauchi et al. | |
| 2005/0237493 A1 * | 10/2005 | Tajiri | 353/85 |
| 2009/0297100 A1 | 12/2009 | Yamauchi et al. | |

FOREIGN PATENT DOCUMENTS

| | | |
|---|---|---|
| CN | 1900759 A | 1/2007 |
| JP | A-2004-534265 | 11/2004 |
| JP | A-2005-084117 | 3/2005 |
| JP | A-2006-053495 | 2/2006 |
| JP | A-2006-343413 | 12/2006 |

* cited by examiner

*Primary Examiner* — Kevin Pyo
(74) *Attorney, Agent, or Firm* — Oliff & Berridge, PLC (57) ABSTRACT

A projector includes: a light source which emits light; an image forming unit which forms an image having desired size by using light emitted from the light source; and a projection unit which projects the image formed by the image forming unit on a light receiving surface. The projection unit has a light diffusing member disposed at a position where an intermediate image corresponding to light released from the image forming unit is formed to diffuse the light, and a projection system which projects the light diffused by the light diffusing member on the light receiving surface. Diffusion intensity distribution of light released from a predetermined position of the light diffusing member contains at least two prominences with the center axis of the light interposed between the prominences.

10 Claims, 7 Drawing Sheets

PROJECTOR AND PROJECTION UNIT

BACKGROUND

1. Technical Field

The present invention relates to a projector and a projection unit.

2. Related Art

Currently, a projector which applies light emitted from a lighting device to a light modulation device and projects enlarged image light released from the light modulation device onto a screen via a projection system such as a projection lens is widely known.

According to an ordinary type of this projector, the lighting device is constituted by a metal halide lamp, a halogen lamp, or the like. In recent years, however, the use of semiconductor laser (LD) has been proposed for size reduction of the lighting device and the projector. This laser beam source has such advantages as preferable color reproducibility, image display with high luminance and contrast, immediate light turn-on, and other advantages as well as compactness.

According to the structure including the laser beam, however, speckle pattern containing randomly distributed bright points and dark points is produced on the enlarged and projected image light due to the characteristics of the laser beam as coherent light. The speckle pattern is generated by interference between lights emitted from the respective points of the projection system and having irregular phase relations. The image containing the speckle pattern is not preferable since it scintillates for the eyes of the observer.

For overcoming this problem, a display system disclosed in JP-A-2005-84117 oscillates and rotates a diffusion element by external force such that speckle pattern can be varied within a period shorter than a display rewrite period perceivable by human sense. In this method, speckle pattern is averaged by integration such that the speckles cannot be visually recognized by the eyes of the observer (for example, see JP-A-2005-84117 and JP-A-2006-53495).

A projection-type image display apparatus according to JP-A-2005-84117 includes a one-dimensional display element containing a plurality of emission units arranged in one direction, an optical scan unit which performs scanning of light emitted from the one-dimensional display element to form a two-dimensional intermediate image, and a projection lens which enlarges and projects the two-dimensional intermediate image on a display unit. Also, this image display apparatus operates a diffuser disposed between the optical scan unit and the projection lens to timely apply phase modulation to light passing through the diffuser. This method reduces speckle noise and produces preferable images.

A display system according to JP-A-2006-53495 includes a light source for emitting light, a scan unit for performing scan of the light emitted from the light source, and first and second optical systems for displaying the light of the scan performed by the scan unit on a display surface. According to this structure, the first optical system forms an intermediate image corresponding to the light of the scan performed by the scan unit, and the second optical system forms an image corresponding to the light of the intermediate image on the display surface. A light diffusion angle conversion element is disposed between the first optical system and the second optical system to enlarge the diffusion angle of entering laser beam and supply the resultant laser beam to the second optical system. When the incident angle (diffusion angle) of light having entered the scanning surface to be observed by the observer is increased by using the light diffusion angle conversion element, a plurality of light components having different incident angles for entering the second optical system are produced. As a result, reduction of speckle noise can be achieved.

The technologies disclosed in JP-A-2005-84117 and JP-A-2006-53495 employ the optical element for diffusing entering light. However, it is difficult to effectively reduce speckle noise only by the function of the optical element used in these technologies.

SUMMARY

It is an advantage of some aspects of the invention to provide a projector and a projection unit capable of securely achieving reduction of speckles.

A projector includes according to a first aspect of the invention includes: a light source which emits light; an image forming unit which forms an image having desired size by using light emitted from the light source; and a projection unit which projects the image formed by the image forming unit on a light receiving surface. The projection unit has a light diffusing member disposed at a position where an intermediate image corresponding to light released from the image forming unit is formed to diffuse the light, and a projection system which projects the light diffused by the light diffusing member on the light receiving surface. Diffusion intensity distribution Of light released from a predetermined position of the light diffusing member contains at least two prominences with the center axis of the light interposed between the prominences.

According to the projector having this structure, light emitted from the light source enters the image forming unit, where an image having desired size is formed. Then, an intermediate image corresponding to the image formed by the image forming unit is produced, and diffused by the light diffusing member to display the image on the light receiving surface by using the projection system.

In this case, the diffusion intensity distribution of light released from the predetermined position of the light diffusing member contains at least two prominences with the center axis of the light interposed between the prominences. Since the optical distance between a beam on one side and a beam on the other side of the center axis of the light becomes longer, intensities of the beams having long optical distance and capable of contributing reduction of speckle noise increase. Thus, the beams producing complicated optical path difference and phase difference are fully utilized, and reduction of speckle noise is sufficiently achieved. As a result, scintillation caused between the light receiving surface and the observer can be lowered, and therefore preferable visual recognition of images formed by projection light and reduction of fatigue of the eyes of the observer can be achieved. Accordingly, projection of high quality images can be realized.

According to this aspect of the invention, the only requirement to be satisfied is that the diffusion intensity distribution of light released from a predetermined position of the light diffusing member contains at least two prominences with the center axis of the light interposed between the prominences. The diffusion intensity distribution herein refers to a distribution in the plane perpendicular to the exit end surface of the light diffusion member, and may contain circular prominences to exhibit diffusion intensity distribution of this type in any plane. Also, the diffusion intensity distribution may contain two prominences which do not exist in an arbitrary plane but are present as viewed three-dimensionally.

A projector according to a second aspect of the invention includes: a light source which emits light; an image forming unit which forms an image having desired size by using light emitted from the light source; and a projection unit which projects the image formed by the image forming unit on a light receiving surface. The projection unit has a light diffusing member disposed at a position where an intermediate image corresponding to light released from the image forming unit is formed to diffuse the light, and a projection system which projects the light diffused by the light diffusing member on the light receiving surface. Diffusion intensity distribution of light released from a predetermined position of the light diffusing member has a flat portion extending across the center axis of the light.

According to the projector having this structure, light emitted from the light source enters the image forming unit, where an image having desired size is formed. Then, an intermediate image corresponding to the image formed by the image forming unit is produced, and diffused by the light diffusing member to display the image on the projection surface by using the projection system.

In this case, the diffusion intensity distribution of light released from the predetermined position of the light diffusing member contains a flat portion extending across the optical axis of the light. Since the optical distance between a beam on one side and a beam on the other side of the center axis of the light becomes longer, intensities of the beams having long optical distance and capable of contributing to reduction of speckle noise increase. Thus, the beams producing complicated optical path difference and phase difference are fully utilized, and reduction of speckle noise is sufficiently achieved. As a result, scintillation caused between the light receiving surface and the observer can be lowered, and therefore preferable visual recognition of images formed by projection light and reduction of fatigue of the eyes of the observer can be achieved. Accordingly, projection of high quality images can be realized.

The diffusion intensity distribution herein refers to a distribution in the plane perpendicular to the exit end surface of the light diffusion member.

It is preferable that the projector further includes an intermediate image forming system which forms an intermediate image of light released from the image forming unit on the optical path between the image forming unit and the light diffusing member.

According to this structure, an intermediate image corresponding to the image released from the image forming unit is produced by the intermediate image forming system and diffused by the light diffusing member to display an image on the light receiving surface by using the projection optical system.

In this case, uniform light can be supplied to the light diffusing member by using the intermediate image forming system disposed on the optical path between the image forming unit and the light diffusing member. Thus, speckle noise on the image released from the light diffusing member can be more effectively reduced.

It is preferable that the light diffusing member is hologram element.

According to this structure, the light diffusing member is constituted by hologram element. The hologram element may be computer generated hologram (CGH; hereinafter abbreviated as CGH) having concave and convex structure artificially produced by calculator on a glass substrate, for example. The CGH is a wave surface conversion element which converts the wave surface of entering light by utilizing diffraction effect. Particularly, a phase modulation type CGH can perform wave surface conversion while producing almost no loss of energy of entering light wave. Thus, the CGH capable of generating uniform intensity distribution or simple-shape intensity distribution can be appropriately incorporated in a projector. Moreover, the CGH freely sets divisions of diffraction grating, and therefore does not cause aberration preferably.

A typically used volume-type light diffusing plate has a larger thickness in the optical axis direction than that of CGH. Thus, blur is produced on the image diffused by the light diffusing plate and projected by the projection system onto the light receiving surface. However, no blur is produced on the image produced by the structure containing the CGH thinner than the light diffusing plate, and therefore a clear image can be produced.

Moreover, it is possible to manufacture a CGH capable of controlling the degree of diffusion of light such that the light can be received by the projection system. In this case, the light diffused by the CGH does not go out of the range of the projection system. Thus, loss of light can be decreased.

It is preferable that the image forming unit is a two-dimensional spatial light modulating element. In this case, it is preferable that a two-dimensional intermediate image produced by the spatial light modulating element is diffused by the light diffusing member.

According to this structure, the image forming unit is a two-dimensional spatial light modulating element. Thus, a two-dimensional intermediate image produced by the spatial light modulating element is diffused by the light diffusing member, and the diffused two-dimensional intermediate image is projected on the light receiving surface by the projection system to display an image having uniform brightness.

It is preferable that the diffusion intensity distribution of the light released from the predetermined position of the light diffusing member varies according to the light entrance position on the entrance end surface of the light diffusing member.

According to this structure, the diffusion intensity distribution of the light released from the light diffusing member varies according to the light entrance position on the entrance end surface of the light diffusing member. That is, beams having large difference in optical path distance and contributing to reduction of speckle noise vary according to the entrance position on the light diffusing member, and the light diffusing intensity distribution exhibits high intensity of the beams having long optical distance. In this case, light intensity of the beams capable of contributing to reduction of speckle noise contained in light entering any position of the light diffusing member becomes high, and thus the beams producing complicated optical path difference and phase difference can be sufficiently utilized. Accordingly, reduction of speckle noise can be sufficiently achieved.

It is preferable that the optical distance between the projection system and the light receiving surface is longer than the optical distance between the image forming unit and the projection system.

According to this structure, the optical distance between the projection system and the light receiving surface is longer than the optical distance between the image forming unit and the projection system. Since the light diffusing member has the distribution described above in the section of long optical distance, relative difference in the optical distance increases. Thus, reduction of speckle noise can be more effectively achieved.

A projection unit according to a third aspect of the invention includes: an intermediate image forming system which forms an intermediate image of entering light; a light diffusing member which diffuses light released from the intermediate image forming system; and a projection system which projects light diffused by the light diffusing member on a light receiving surface. Diffusion intensity distribution of light released from a predetermined position of the light diffusing member contains at least two prominences with the center axis of the light interposed between the prominences.

According to the projection unit having this structure, the optical distance between the beam on the one side of the center axis of the light and the beam on the other side is long in the diffusion intensity distribution of light released from the predetermined position on the light diffusing member. In this case, beams capable of producing complicated optical path difference and phase difference is sufficiently utilized. Thus, the projection unit capable of sufficiently achieving reduction of speckle noise can be provided.

A projection unit according to a fourth aspect of the invention includes: an intermediate image forming system which forms an intermediate image of entering light; a light diffusing member which diffuses light released from the intermediate image forming system; and a projection system which projects light diffused by the light diffusing member on a light receiving surface. Diffusion intensity distribution of light released from a predetermined position of the light diffusing member has a flat portion extending across the center axis of the light.

According to the projection unit having this structure, the optical distance between the beam on the one side of the center axis of the light and the beam on the other side is long in the diffusion intensity distribution of light released from the predetermined position on the light diffusing member. In this case, beams capable of producing complicated optical path difference and phase difference is sufficiently utilized. Thus, the projection unit capable of sufficiently achieving reduction of speckle noise can be provided.

BRIEF DESCRIPTION OF THE DRAWINGS

The invention will be described according to the accompanying drawings, wherein like numbers reference like elements.

DESCRIPTION OF EXEMPLARY EMBODIMENTS

A projector and a projection unit according to an embodiment of the invention are hereinafter described with reference to the drawings. The scales of the components shown in the figures are appropriately changed for each figure so that the respective components have sufficient sizes for easy recognition.

Embodiment

A projector according to an embodiment of the invention is now described with reference to FIGS. 1 through 7.

In this embodiment, a projection-type projector which projects color light containing image information produced by a spatial light modulation device onto a screen (light receiving surface) via a projection system is discussed as an example of the projector.

Figure 1:
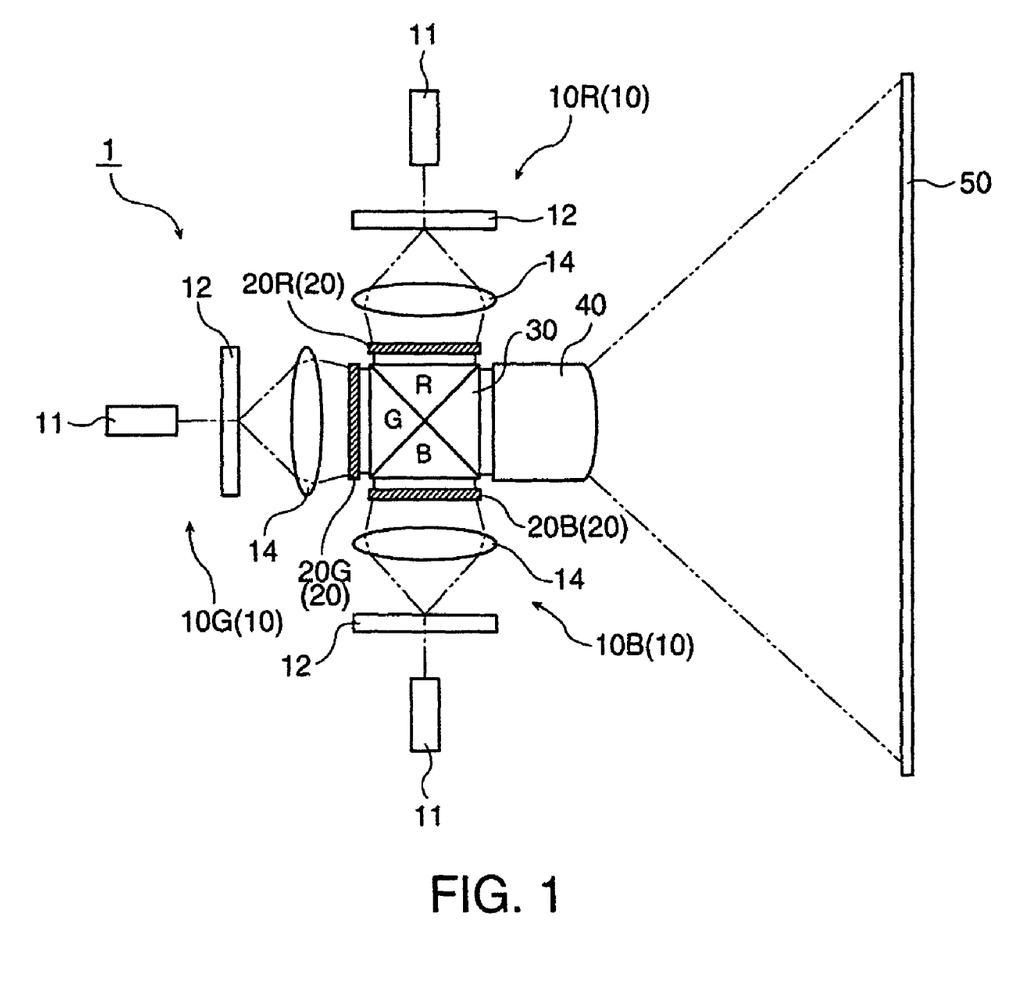
FIG. 1 schematically illustrates a structure of a projector according to an embodiment of the invention, showing optical paths in the structure.

As illustrated in FIG. 1, a projector 1 in this embodiment projects light containing image information on a reflection-type screen 50 from the front side of the screen 50.

The projector 1 shown in FIG. 1 includes a light source device 10, a light modulation device (image forming unit) 20, a dichroic prism (color combining unit) 30, and a projection unit 40. In the following description, the light modulation device is referred to as liquid crystal light valve.

The light source device 10 has a red color light source device (light source) 10R for emitting red light, a green color light source device (light source) 10G for emitting green light, and a blue color light source device (light source) 10B for emitting blue light.

The liquid crystal light valve 20 has a two-dimensional red color light modulation device 20R for modulating light emitted from the red color light source device 10R according to image information, a two-dimensional green color light modulation device 20G for modulating light emitted from the green color light source device 10G according to image information, and a two-dimensional blue color light modulation device 20B for modulating light emitted from the blue color light source device 10B according to image information. The dichroic prism 30 combines the respective color lights modulated by the light modulation devices 20R, 20G and 20B.

The projection unit 40 projects the light combined by the dichroic prism 30 on the screen 50.

Each of the light source devices 10R, 10G and 10B has a light source 11, a diffraction optical element 12 for diffracting light emitted from the light source 11, and an angle controlling optical element 14 for controlling emission angle of the light diffracted by the diffraction optical element 12. Each structure of the light source devices 10R, 10G and 10B is not limited to the structure shown herein.

Figure 2:
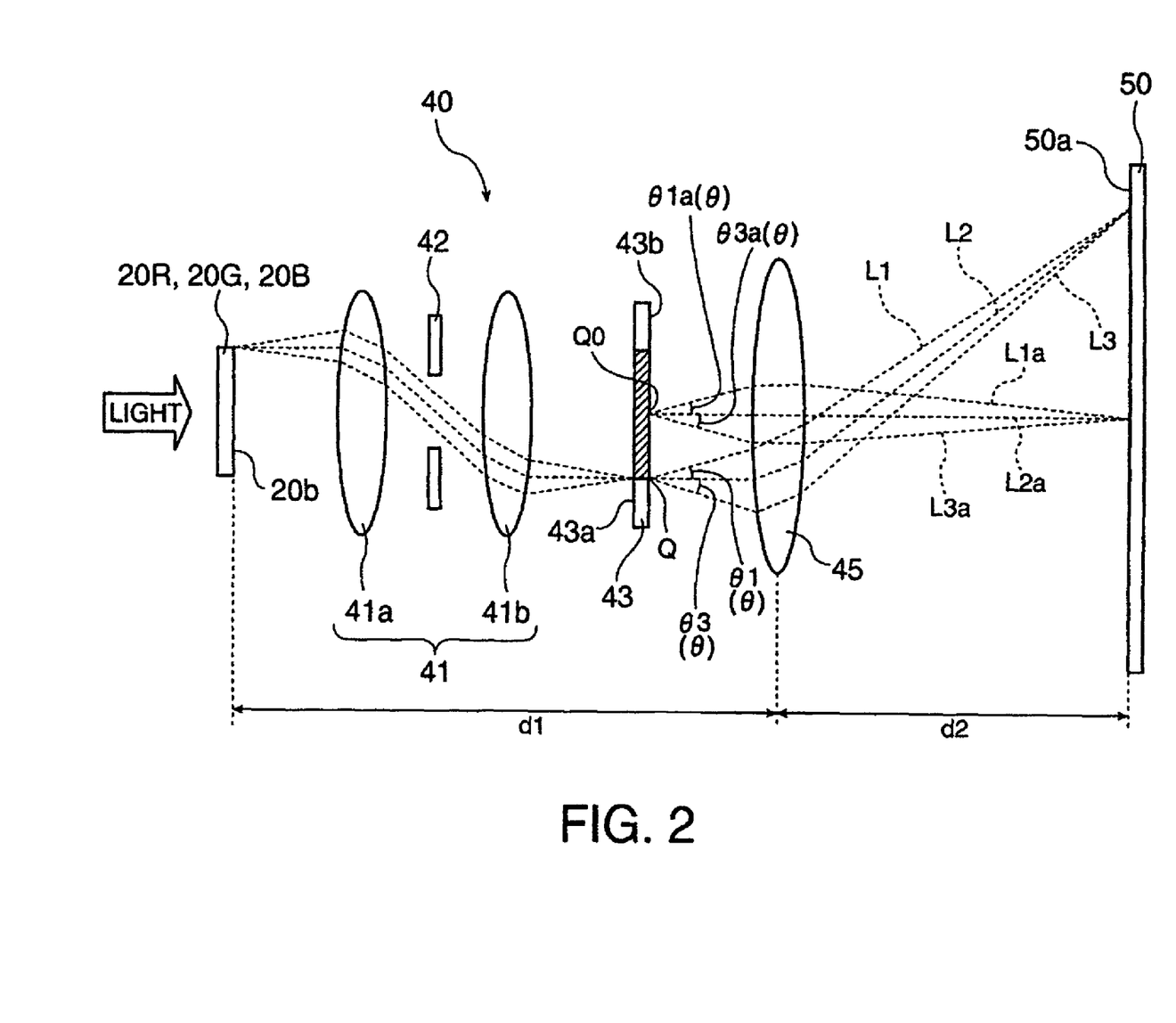
FIG. 2 schematically illustrates a structure of a projection unit included in the projector shown in FIG. 1, showing optical paths in the structure.

The projection unit 40 is now discussed with reference to FIG. 2. In FIG. 2, the liquid crystal light valves 20R, 20G and 20B, the projection unit 40, and the screen 50 are disposed in a line for simplifying the optical paths along which light having entered the liquid crystal light valves 20G, 20G and 20B travels toward the screen 50. Also, the dichroic prism 30 is not shown in the figure.

As illustrated in FIG. 2, the projection unit 40 has a first lens group 41, a diffuser 43, and a second lens group 45 in this order on the optical path. When the optical distance between an exit end surface 20b of each of the liquid crystal light valves 20R, 20G and 20B and the second lens group 45 and the optical distance between the second lens group 45 and an entrance end surface 50a of the screen 50 are d1 and d2, respectively, the relation d1<d2 holds.

The first lens group (intermediate image forming system) 41 forms an intermediate image corresponding to light combined by the dichroic prism 30 on or in the vicinity of the diffuser 43. The first lens group 41 is an equivalent magnification image formation lens constituted by a front lens group 41a and a rear lens group 41b disposed approximately symmetric with respect to an aperture stop 42. It is preferable that the front lens group 41a and the rear lens group 41b have both-side tele-centricity considering the visibility angle characteristics of the liquid crystal light valves 20R, 20G and 20B. Each of the front lens group 41a and the rear lens group 41b contains a plurality of convex and concave lenses. The shape, size, lens interval, lens number, tele-centricity, magnification, and other lens properties of the convex and concave lenses are appropriately varied according to the desired characteristics.

The diffuser (light diffusing member) 43 diffuses light coming from the first lens group 41 to produce diffusing light, and releases the diffusing light through an exit end surface 43b. According to this embodiment, the diffuser 43 refracts laser beam by the exit end surface 43b to diffuse the laser beam.

Figure 3:
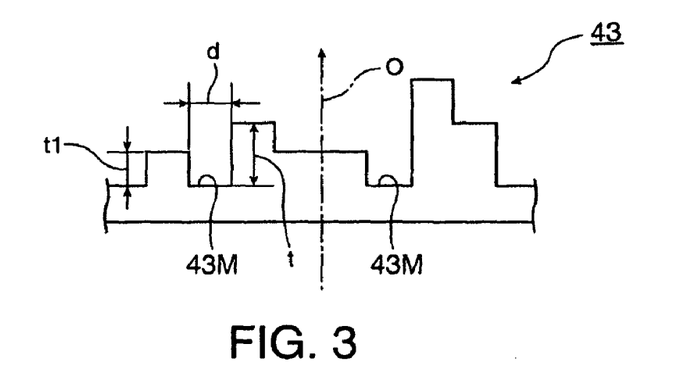
FIG. 3 is a plan view of a light diffusing member included in the projector shown in FIG. 1.

FIG. 3 is a side view showing an enlarged part of the diffuser 43. The diffuser 43 is made of light transmissive material such as quartz (glass) and transparent synthetic resin, for example. The diffuser 43 in this embodiment is constituted by a surface relief type hologram element. An example of the hologram element in this case is a computer generated hologram (CGH; hereinafter referred to as CGH) having concave and convex structure artificially produced by a calculator on a glass substrate. The CGH is a wave surface conversion element which converts the wave surface of entering light by utilizing diffraction effect. Particularly, a phase modulation type CGH can perform wave surface conversion while producing almost no loss of energy of entering light wave. Thus, the CGH can generate uniform intensity distribution or simple-shape intensity distribution, More specifically, the diffuser 43 has a plurality of rectangular concaves (concave and convex structure) 43M having depths different from each other on the surface of the diffuser 43. Also, a plurality of convexes each of which is disposed between an adjoining pair of the concaves 43M have heights different from each other. The diffuser 43 obtains a predetermined diffusing function by appropriately controlling the surface conditions including a pitch d of the concaves 43M and a depth (height of convex) t of the concaves 43M. An example of the design method for optimizing the surface conditions includes a predetermined calculation method (simulation method) such as repetitive Fourier method.

It is preferable that a depth t1 of the diffuser 43 shown in FIG. 3 is approximately 100 nm, and that the thickness of the diffuser 43 in an optical axis O direction is in the range from about 1 μm to 10 μm.

As illustrated in FIG. 2, the second lens group (projection system) 45 enlarges and projects an intermediate image formed on or in the vicinity of the diffuser 43 onto the screen 50. The second lens group 45 shown in FIG. 2 has only one convex lens, but actually the second lens group 45 is constituted by a plurality of lenses. The shape, size, lens interval, and the lens number are appropriately changed according to the required characteristics.

The light diffused at a predetermined position by using the diffuser 43 is now discussed.

As illustrated in FIG. 2, the light released from the first lens group 41 enters the entrance end surface 43a of the diffuser 43 in the direction perpendicular to the entrance surface 43a. Then, the light is released from the exit end surface 43b of the diffuser 43 at a diffusion angle θ, and projected on the screen 50 via the second lens group 45.

The light diffused at a point Q (point in the peripheral area of the intermediate image) of the diffuser 43 is herein explained. The light diffused by the diffuser 43 has a predetermined width. A beam at the upper end of the diffused light in the plan view is L1, a beam on the center axis is L2, and a beam at the lower end is L3. The light diffused by the diffuser 43 converges on the upper side of the screen 50 by the function of the second lens group 45. In this case, the optical path lengths (optical distances) of the beams L1, L2 and L3 from the diffuser 43 to the screen 50 have relation of L1<L2<L3.

Figure 5:
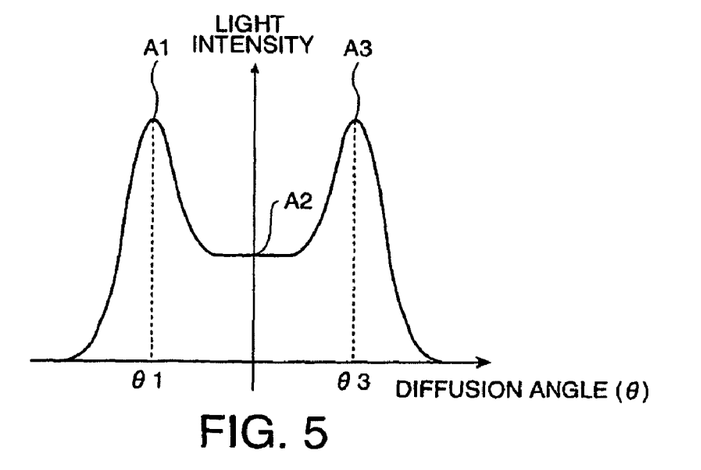
FIG. 5 shows diffusion intensity distribution of light released from the light diffusing member shown in FIG. 3.

FIG. 5 shows diffusion intensity distribution of the light reaching the point Q of the entrance end surface 43a in the vertical direction produced by the diffuser 43. In FIG. 5, the horizontal axis indicates the diffusion angle θ at the diffuser 43 shown in FIG. 2, and the vertical axis indicates light intensity.

As shown in FIG. 5, the diffusion intensity distribution of the light released from the point Q of the diffuser 43 is controlled such that the light intensities of the lights having relatively large optical path difference, that is, light intensity A1 of the beam L1 at the diffusion angle θ1 and light intensity A3 of the beam L3 at the diffusion angle θ3 become the maximum. Thus, the diffuser 43 is so designed that the diffusion intensity distribution of the light released from the point Q of the diffuser 43 contains a symmetric prominence on both sides with respect to the center axis. More specifically, the diffusion intensity distribution has a circular shape as viewed from the exit end surface 43b of the diffuser 43. The diffusion intensity distribution herein refers to an in-plane distribution perpendicular to the exit end surface 43b of the diffuser 43.

The distribution shown in FIG. 5 is the diffusion intensity distribution of the light released from the points on a concentric circle (point in the peripheral area of the intermediate image) of the diffuser 43.

Figure 6:
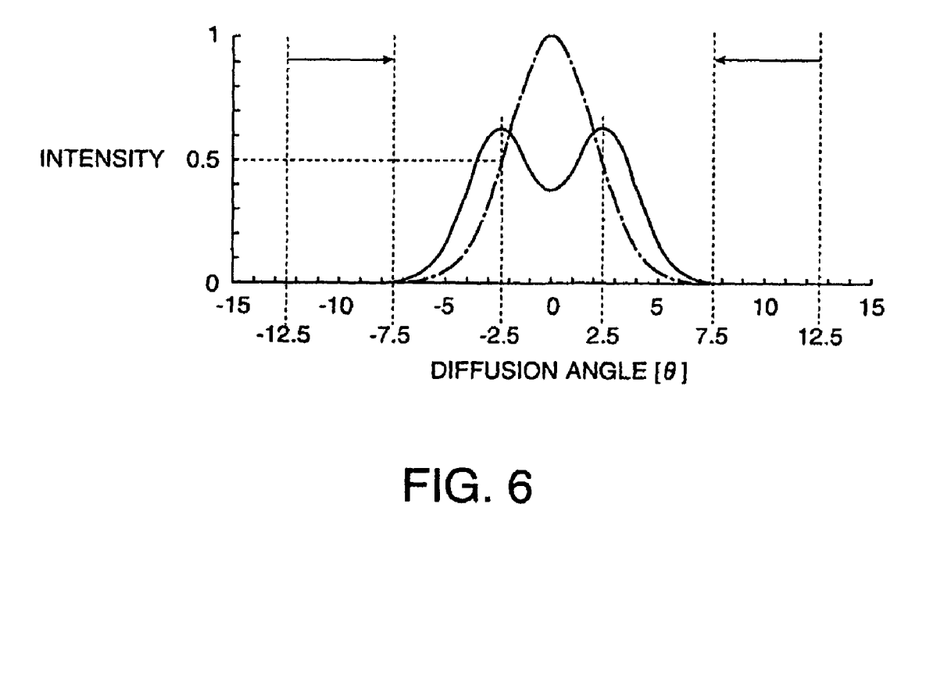
FIG. 6 shows diffusion intensity distribution of light released from the light diffusing member in related art.

In this case, the angles θ1 and θ3 are angles at which the optical path difference becomes the maximum in the range between the diffusion angle of the light released from the diffuser 43 and the largest possible angle of light receivable by the second lens group 45. As illustrated in FIG. 6, the diffusion angle of the light released from the diffuser 43 is 5°, and the receivable angle of the second lens group 45 is 12.5°, for example. The maximum allowable angle is 7.5°, and thus the angles θ1 and θ3 are set at this maximum allowable angle.

When the prominences of the diffusion intensity distribution are shifted to the left from the angle θ1 and to the right from the angle θ3 in FIG. 5, loss of light may be produced. Thus, the diffusion intensity distribution may exhibit prominences (solid line in FIG. 6) at angles (±2.5°) corresponding to half value of the range of Gaussian distribution indicated by a dashed line in FIG. 6. According to this diffusion intensity distribution, the optical path length is shorter than that of the diffusion intensity distribution having prominences at the angles θ1 and θ3. However, reduction of speckle noise can be still achieved with decrease in loss of light.

According to this embodiment, the diffusion intensity distributions of light released from the point Q of the diffuser 43 shown both in FIG. 5 and FIG. 6 can be employed, but only the diffusion intensity distribution shown in FIG. 5 is herein discussed as an example.

Figure 4:
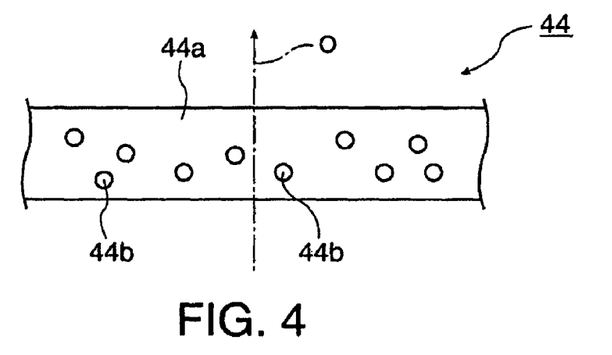
FIG. 4 is a plan view of a light diffusing member in related art.

A volume-type diffusion plate (including volume-type hologram element produced by interference of two beams) used in related art and the diffuser 43 used in this embodiment are now compared. FIG. 4 shows a typical example of a volume-type diffusion plate 44 used in related art which contains diffusion particles 44b dispersed in a base material 44a. The thickness of the diffusion plate 44 in the direction of the optical axis O is in the range from 1 mm to 2 mm. The image projected on the screen 50 corresponds to an image formed at the rear focal position of the second lens group 45. Since the thickness of the diffusion plate 44 is larger than that of the diffuser 43 used in this embodiment, a lens having a large focal depth needs to be incorporated in the second lens group 45. According to the structure including the hologram element as the diffuser 43 in this embodiment, however, a lens having a small focal depth can be used in the second lens group 45. Thus, cost of the lens can be reduced. Moreover, the degree of diffusion of light can be controlled by using the diffuser 43 constituted by the hologram element such that the light can be received by the second lens group 45. In this case, the light diffused by the diffuser 43 does not go out of the range of the second lens group 45. Thus, loss of light can be decreased.

When light enters the related-art diffuser in the vertical direction, the diffusion intensity distribution of the light exhibits Gaussian distribution having no flat intensity distribution part as shown in FIG. 6. In this case, the light intensities of the beam L1 and beam L3 decrease even in the condition where large optical path difference between the beam L1 at the diffusion angle θ1 and the beam L3 at the diffusion angle θ3 is produced. Thus, reduction of speckle noise cannot be sufficiently achieved.

According to the diffuser 43 in this embodiment, the light intensity A1 of the beam L1 and the light intensity A3 of the beam L3 as the beam having large optical path difference become the maximum. More specifically, in the diffusion intensity distribution of light diffused by the diffuser 43, the two beams L1 and L3 have peak intensity, and a light intensity A3 of the beam L2 is about half of the intensities A1 and A2 of the beams L1 and L3. Thus, the lights L1 and L3 capable of producing complicated optical path difference and phase difference can be sufficiently utilized.

By using the diffuser 43 having this structure, a plurality of diffusion patterns are produced and timely superimposed on the screen 50 so that reduction of speckle noise can be achieved.

According to the projector 1 in this embodiment, the diffusion intensity distribution of light released from the diffuser 43 is a distribution exhibiting at least two prominences of large light intensities of the beams L1 and L3 having relatively large difference in optical path length from the diffuser 43 to the screen 50. By increasing the light intensities of the beams L1 and L3 having large difference in optical path length and contributing reduction of speckle noise, the beams L1 and L3 capable of producing complicated optical path difference and phase difference can be sufficiently utilized. In this case, reduction of speckle noise can be sufficiently increased without rotation (swing or the like) of the diffuser 43. Thus, scintillation produced between the screen 50 and the observer can be lowered, and therefore preferable visual recognition of images formed by projection light and reduction of fatigue of the eyes of the observer can be achieved. Accordingly, projection of high quality images can be realized.

Under the condition of d1<d2, the diffuser 43 has the distribution shown in FIG. 5 in the section of d2 as the longer optical path length. Thus, the relative difference in optical path length becomes larger, and more effective reduction of speckles can be achieved.

Accordingly, the projector 1 in this embodiment more securely reduces speckles.

The projection unit 40 in this embodiment having the structure capable of more securely reducing speckle noise is applicable to other types of projector. In this case, reduction of speckle noise similar to those on the image produced by the projector 1 can be achieved.

The diffusion intensity distribution of light diffused by the diffuser 43 is not limited to the one shown in FIG. 5 which is symmetric with respect to the center axis. More specifically, the light intensity A1 of the beam L1 and the light intensity A3 of the beam L3 are not required to be equal intensity when the requirement that these intensities A1 and A3 are larger than the light intensity A2 of the beam L2 is satisfied.

The diffuser 43 is not limited to the hologram element, but may be constituted by a micro lens array.

Figure 7:
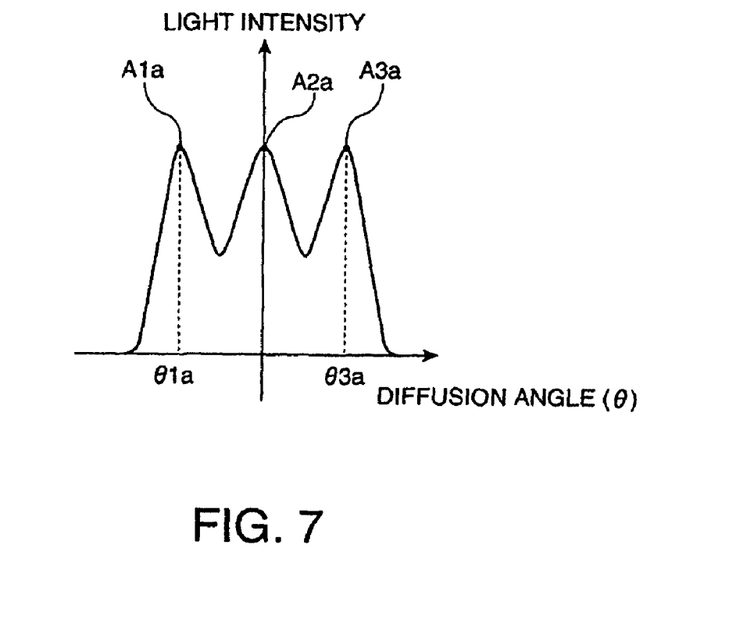
FIG. 7 shows intensity distribution of light released from the light diffusing member shown in FIG. 3.

As illustrated in FIG. 2, optical path lengths of a beam L1a and a beam L3a released from a point Q0 as the center of the diffuser 43 are equal. Thus, the optical path difference between the beam L1a and a beam L2a becomes equivalent to the optical path difference between the beam L2a and the beam L3a. In this case, it is preferable that the diffusion intensity distribution of light at the point Q0 has three prominences of large light intensities A1a, A2a and A3a of the beams L1a, L2a and L3a having diffusion angles of θ1a, θ2a and θ3a, respectively, as illustrated in FIG. 7. As in this case, the diffusion intensity distribution of light released from a predetermined position of the diffuser 43 may vary depending on the light entrance position of on the entrance end surface of the diffuser 43. According to this structure, light reaching any position of the diffuser 43 and capable of contributing reduction of speckle noise obtains large light intensity. Thus, light producing complicated optical path difference and phase difference can be sufficiently utilized, and the effect of speckle noise reduction can be sufficiently provided.

The diffuser 43 is not limited to the relief-shaped component shown in FIG. 3, but may be a so-called blaze-shaped component having triangular concaves containing slopes.

The diffusion intensity distribution is not required to have prominences at the angles θ1 and θ3 as in this embodiment when the requirement that the distribution has a recess at least at the angle of 0° is satisfied.

While the diffusion intensity distribution of the diffuser 43 has circular prominences in this embodiment, such diffusion intensity distribution which does not have prominence in an arbitrary plane but exhibits two prominences as viewed three-dimensionally.

Figure 8A:
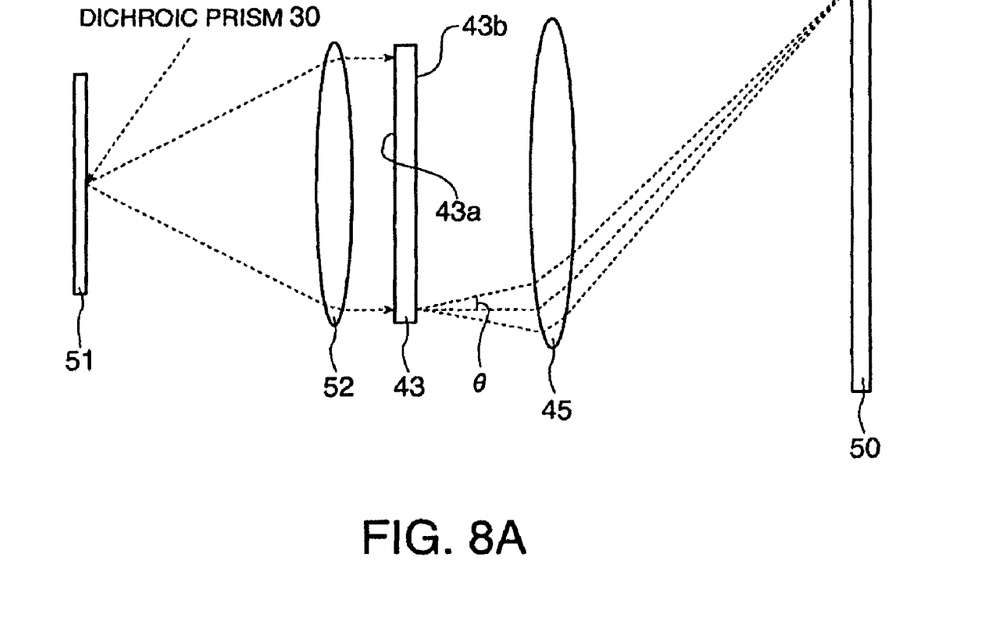
FIGS. 8A and 8B schematically illustrate partial structures of projectors in modified examples of the embodiment, showing optical path in the structures.

In this embodiment, the image forming unit includes the liquid crystal light valves 20R, 20G and 20B. However, the projector (image display apparatus) may be a scan type projector which includes a scan unit as an image forming unit for displaying an image of desired size on the display surface by scan of laser beam emitted from a laser beam source (light source) on the screen 50. The scan type projector performs scan of light combined by the dichroic prism 30 by using an MEMS mirror (scan unit) 51 as shown in FIG. 8A, for example. Then, the scan type projector collimates the light by a collimating lens 52, and supplies the collimated light to the diffuser 43. Finally, the scan type projector projects an intermediate image formed on the diffuser 43 onto the screen 50 via the second lens group 45.

According to the scan type projector having this structure, light capable of producing complex optical path difference and phase difference can be sufficiently utilized similarly to the projector in this embodiment. Thus, reduction of speckle noise can be sufficiently achieved.

Figure 8B:
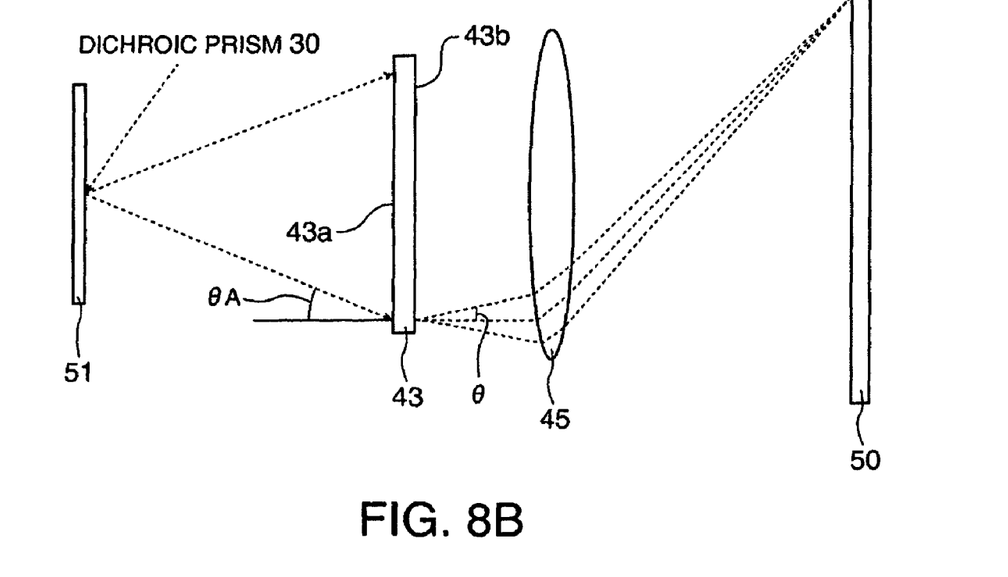

The collimating lens 52 in the scan type projector may be eliminated as illustrated in FIG. 8B. In this case, light reaching the diffuser 43 diagonally enters the entrance end surface 43a of the diffuser 43 at an angle θA as illustrated in FIG. 8B. Then, the light is diffused therefrom at an angle θ with respect to the vertical direction of the entrance end surface 43b. In case of the scan type projector, therefore, light producing complicated optical path difference and phase difference can be sufficiently utilized by using the diffuser 43 having such light diffusion intensity distribution which exhibits high intensity of beam capable of contributing reduction of speckle noise according to the incident angle θA. Thus, reduction of speckle noise can be sufficiently achieved. In this case, the number of components is smaller than that of the structure shown in FIG. 8A. Thus, cost reduction can be improved.

According to the scan type projector, light enters the entrance end surface 43a of the diffuser 43 in the diagonal direction. In this case, the diffusion intensity distribution along the exit end surface 43b exhibits high intensity of beam capable of contributing to reduction of speckle noise.

Modified Example 1 of the Embodiment

Figure 9:
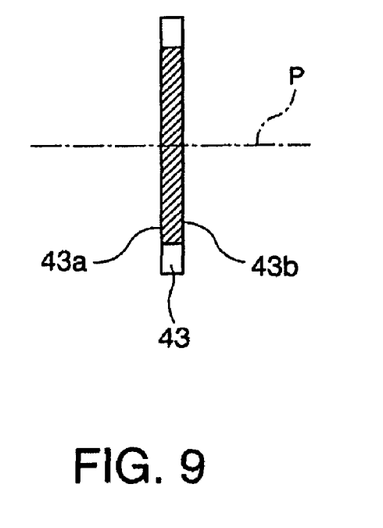
FIG. 9 illustrates a light diffusing member in a modified example of the light diffusing member shown in FIG. 2.

While the diffuser (light diffusing member) 43 included in the structure shown in FIG. 2 is stationary, the diffuser 43 may be rotated around a rotation axis P as illustrated in FIG. 9. In this case, the position of light entering the entrance end surface 43a of the diffuser 43 sequentially changes, and this change shifts visually recognizable speckles (speckle pattern caused by interference) or varies the patterns of speckles in a complicated manner. As a result, the patterns of speckles are averaged by integration within the period of after image effect for the human eyes, and scintillation caused by speckles is not visually recognized. In this case, scintillation produced between the screen 50 and the observer can be lowered, and therefore preferable visual recognition of images formed by projection light and reduction of fatigue of the eyes of the observer can be achieved. Accordingly, projection of high quality images can be realized.

Figure 10:
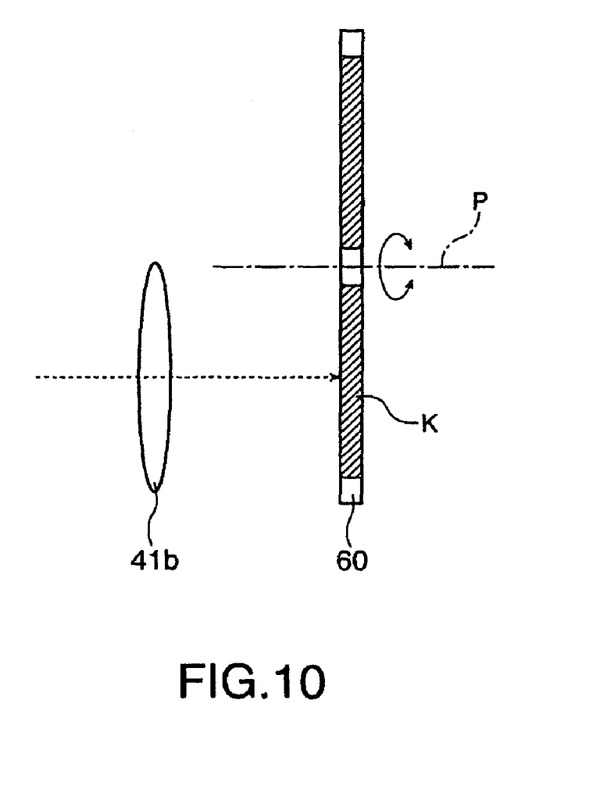
FIG. 10 illustrates a light diffusing member in a modified example of the light diffusing member shown in FIG. 2.

The rotation axis P of the diffuser 43 is not limited to the center of the diagonal line of the intermediate image produced by the liquid crystal light valves 20R, 20G and 20B and formed on the diffuser 43, but may be the rotation axis P of a diffuser 60 as a rotation axis located in an area out of a formation area K of the intermediate image. In this case, the size of the diffuser 60 is approximately twice as large as that of the diffuser 43. When the rotation axis P is positioned in the area where the intermediate image on the diffuser is not formed, the light having entered the diffuser 60 does not have dead center (point at which movement stops for an instant). Thus, generation of speckle noise can be more effectively prevented.

Modified Example 2 of the Embodiment

According to the embodiment shown in FIG. 1, the diffusion intensity distribution of light emitted from the point Q of the diffuser 43 has two peak intensities as shown in FIG. 5. However, the diffusion distribution may have a rectangular flat top shape which contains a flat portion extending across the center axis of light.

According to the diffuser in this modified example, the diffusion intensity distribution of light emitted from the point Q of the diffuser exhibits high intensities of the beam L1 at the diffusion angle θ1 and of the beam L3 at the diffusion angle θ3 which produce large relative optical path difference between the diffuser and the screen 50. Also, the light diffusion intensity distribution in this modified example has the constant light intensity A1 from the beam L1 at the diffusion angle θ1 to the beam L3 at the diffusion angle θ3.

According to the diffusion intensity distribution of light released from the point Q of the diffuser in this modified example, the flat top portion is produced not by manufacture error but produced intentionally (such that a flat portion extends through a predetermined area) in designing the diffuser.

In addition, this modified example is different from the first embodiment in that the light intensity of the beam L2 emitted from the point Q is equal to the light intensities of the beam L1 and the beam L3.

Similarly to the above examples, the light diffusion intensity distribution produced by the diffuser in this modified example exhibits higher light intensities of the beams L1 and L3 having large optical path difference and capable of contributing reduction of speckle noise than that of the Gaussian distribution shown in FIG. 6. In this case, the beams L1 and L3 capable of producing complicated optical path difference and phase difference can be sufficiently utilized. Thus, reduction of speckle noise can be sufficiently achieved.

Figure 11:
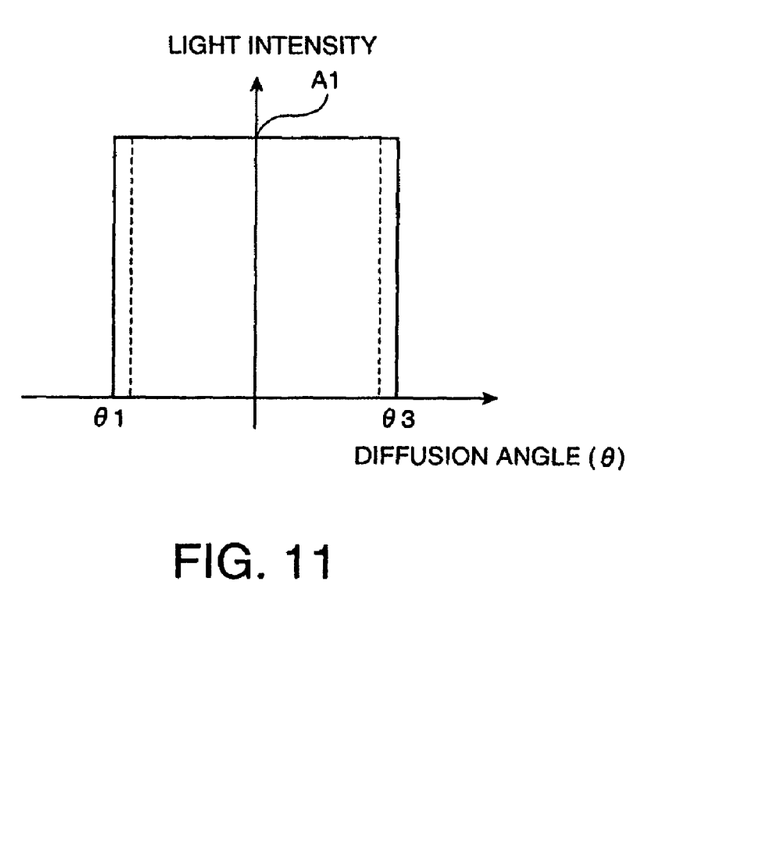
FIG. 11 shows diffusion intensity distribution of light released from a light diffusing member in a modified example.

Moreover, manufacture of the diffuser having the light diffusion intensity distribution shown in FIG. 11 is easier than that of the diffuser 43 having the light diffusion intensity distribution according to the embodiment shown in FIG. 5. However, in case of the diffuser constituted by hologram element, both the diffuser 43 exhibiting the light diffusion intensity distribution shown in FIG. 5 and the diffuser exhibiting the light diffusion distribution shown in FIG. 11 can be easily manufactured.

The light released from the point Q0 of the diffuser 43 in the embodiment may have the light diffusion intensity distribution containing a flat top portion as in this modified example shown in FIG. 11. However, considering the limitation of power of light, only the light intensities of the beams L1, L2 and L3 capable of greatly contributing to reduction of speckle noise may be increased as shown in FIG. 7 so as to project a bright image on the screen 50 with reduced speckle noise.

Figure 12:
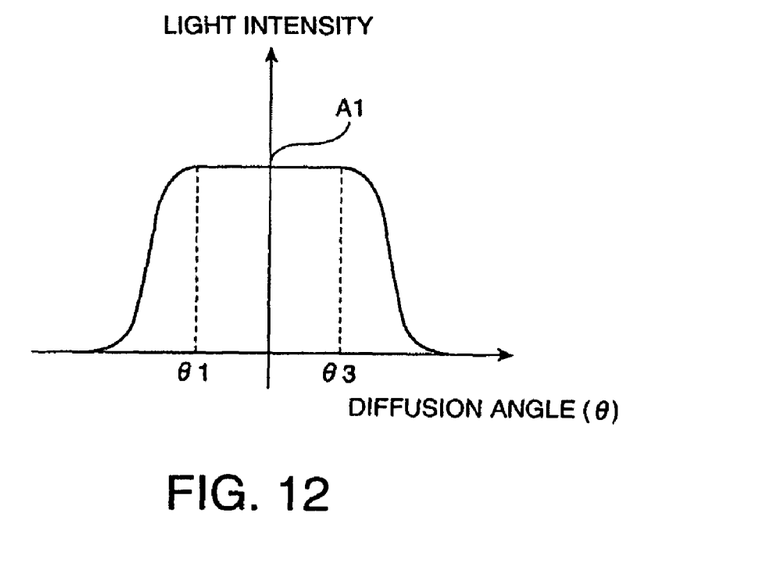
FIG. 12 shows diffusion intensity distribution of the light shown in FIG. 11 in a modified example.

The diffusion intensity distribution of light emitted from the diffuser in this modified example is not limited to a rectangular distribution as shown in FIG. 11, but may be such a distribution whose bottom smoothly varies from the maximum light intensity A1 to zero as shown in FIG. 12.

While the flat portion continues from the angle θ1 to the angle θ3 in the distributions shown in FIGS. 11 and 12, the flat region need not continue through this region when the requirement that at least a small part of the flat portion extends across the center axis of the light is satisfied. When the diffusion intensity distribution contains at least a small flat portion extending across the center axis, reduction of speckle noise is achievable.

It is intended that the technical range of the invention is not limited to the examples described and depicted herein, and therefore various modifications and changes may be made without departing from the scope and spirit of the invention.

While the color light combining unit is constituted by a cross dichroic prism in this embodiment, the combining unit may be a unit containing dichroic mirrors arranged in cross shape, or arranged in parallel for combining color lights, for example.

While the light modulation devices are constituted by light transmission type liquid crystal light valves, the light modulation devices may be light valves of types other than liquid crystal type, or reflection type light valves. Examples of these light valves involve reflection type liquid crystal light valves, and digital micromirror devices. The structure of the projection system may be appropriately varied according to the types of light valves to be used.

The technology of the invention is applicable not only to projector, but also to all projection systems using laser beams such as laser processing device and exposing device.

While the first optical system is constituted by an optical system having both-side tele-centric characteristics, the first optical system may contain an enlarging lens for enlarging the image formed by the liquid crystal light valves and a collimating lens for collimating the enlarged image.

The type of projector is not limited to a front projector, but may be a rear projector.

The entire disclosure of Japanese Patent Application No. 2007-205429, filed Aug. 7, 2007 is expressly incorporated by reference herein.

What is claimed is:

1. A projector, comprising:
   a light source which emits light;
   an image forming unit which forms an image having desired size by using light emitted from the light source; and
   a projection unit which projects the image formed by the image forming unit on a light receiving surface,
   wherein
      the projection unit has a light diffusing member disposed at a position where an intermediate image corresponding to light released from the image forming unit is formed to diffuse the light, and a projection system which projects the light diffused by the light diffusing member on the light receiving surface,
      diffusion intensity distribution of light released from a predetermined position of the light diffusing member contains at least two prominences with the center axis of the light interposed between the prominences, and
      from the light diffusing member to the light receiving surface, there is a difference in an optical path length between a light beam on one side of a center axis of light and a light beam on an other side of the center axis of light.

2. The projector according to claim 1, further comprising an intermediate image forming system which forms an intermediate image of light released from the image forming unit on the optical path between the image forming unit and the light diffusing member.

3. The projector according to claim 1, the light diffusing member is hologram element.

4. The projector according to claim 1, wherein:
   the image forming unit is a two-dimensional spatial light modulating element; and
   a two-dimensional intermediate image produced by the spatial light modulating element is diffused by the light diffusing member.

5. The projector according to claim 1, wherein the diffusion intensity distribution of the light released from the predetermined position of the light diffusing member varies according to the light entrance position on the entrance end surface of the light diffusing member.

6. The projector according to claim 1, wherein the optical distance between the projection system and the light receiving surface is longer than the optical distance between the image forming unit and the projection system.

7. A projection unit, comprising:
   an intermediate image forming system which forms an intermediate image of entering light;
   a light diffusing member which diffuses light released from the intermediate image forming system; and
   a projection system which projects light diffused by the light diffusing member on a light receiving surface,
   wherein
      diffusion intensity distribution of light released from a predetermined position of the light diffusing member contains at least two prominences with the center axis of the light interposed between the prominences, and
      from the light diffusing member to the light receiving surface, there is a difference in an optical path length between a light beam on one side of a center axis of light and a light beam on an other side of the center axis of light.

8. The projection unit according to claim 7, the light diffusing member is hologram element.

9. The projection unit according to claim 7, wherein the diffusion intensity distribution of the light released from the predetermined position of the light diffusing member varies according to the light entrance position on the entrance end surface of the light diffusing member.

10. The projector according to claim 1, wherein:
   the light beam on the one side of the center axis of light and the light beam on the other side of the center axis of light converge to a same location on the light receiving surface.

* * * * *